US012723681B2

(12) United States Patent
Karlsson

(10) Patent No.: US 12,723,681 B2
(45) Date of Patent: Sep. 1, 2026

(54) TRANSIT DEVICE FOR LEADING ONE OR MORE CABLES AND/OR PIPES THROUGH AN OPENING IN A PARTITION

(71) Applicant: Roxtec AB, Karlskrona (SE)

(72) Inventor: Andreas Karlsson, Karlskrona (SE)

(73) Assignee: Roxtec AB, Karlskrona (SE)

( * ) Notice: Subject to any disclaimer, the term of this patent is extended or adjusted under 35 U.S.C. 154(b) by 307 days.

(21) Appl. No.: 18/567,991

(22) PCT Filed: Jun. 3, 2022

(86) PCT No.: PCT/SE2022/050549
§ 371 (c)(1),
(2) Date: Dec. 7, 2023

(87) PCT Pub. No.: WO2022/260577
PCT Pub. Date: Dec. 15, 2022

(65) Prior Publication Data

US 2024/0280191 A1 Aug. 22, 2024

(30) Foreign Application Priority Data

Jun. 8, 2021 (SE) .................................... 2150721-5

(51) Int. Cl.
*F16L 5/04* (2006.01)
*F16L 5/08* (2006.01)
(Continued)

(52) U.S. Cl.
CPC *F16L 5/04* (2013.01); *F16L 5/08* (2013.01); *F16L 5/14* (2013.01); *H02G 3/0412* (2013.01); *H02G 3/22* (2013.01)

(58) Field of Classification Search
CPC ....... F16L 5/04; F16L 5/08; F16L 5/14; F16L 5/02; H02G 3/0412; H02G 3/22
See application file for complete search history.

(56) References Cited

U.S. PATENT DOCUMENTS

D645,428 S * 9/2011 Karlsson ...................... D13/199
D657,322 S * 4/2012 Karlsson ...................... D13/199
(Continued)

FOREIGN PATENT DOCUMENTS

DE 102013112252 A1 5/2015
EP 2587106 A1 5/2013
(Continued)

OTHER PUBLICATIONS

PCT International Search Report for PCT Application No. PCT/SE2022/050549 mailed on May 12, 2022 (6 pages).
(Continued)

*Primary Examiner* — Eugene G Byrd
(74) *Attorney, Agent, or Firm* — Merchant & Gould P.C.

(57) ABSTRACT

A transit device for leading one or more cables and/or pipes through an opening in a partition, wherein the transit device comprises an extension frame connectable to a mounting frame and/or the partition and having an axially extending through opening for the cables and/or pipes. The extension frame comprises a plurality of extension frame modules, each extension frame module having a first end, a second end and axially extending edge portions extending between the first end and the second end. The axially extending edge portions are provided with connection elements, wherein the extension frame modules are connectable to each other through the connection elements to form the extension frame, and the first end of said extension frame modules is provided with a fastening element for fastening to the mounting frame and/or the partition.

25 Claims, 11 Drawing Sheets

(51) Int. Cl.

| | |
|---|---|
| ***F16L 5/14*** | (2006.01) |
| ***H02G 3/04*** | (2006.01) |
| ***H02G 3/22*** | (2006.01) |

(56) References Cited

U.S. PATENT DOCUMENTS

| | | | | |
|---|---|---|---|---|
| D678,213 | S * | 3/2013 | Karlsson | D13/156 |
| 8,674,240 | B2 * | 3/2014 | Karlsson | F16L 5/08 174/652 |
| 10,194,566 | B2 * | 1/2019 | Johansson | H05K 9/0098 |
| 10,298,001 | B2 * | 5/2019 | Nowastowski-Stock | H02G 1/06 |
| 10,574,048 | B2 * | 2/2020 | Nowastowski-Stock | H02G 3/0406 |
| 10,584,726 | B2 * | 3/2020 | Milton | F16B 2/14 |
| D908,642 | S * | 1/2021 | Sträng | H02G 3/22 D13/155 |
| 12,326,212 | B2 * | 6/2025 | Törnström | F16L 5/02 |
| 2004/0093814 | A1 | 5/2004 | Cordts et al. | |
| 2011/0210222 | A1 | 9/2011 | Van Walraven | |
| 2012/0013079 | A1 * | 1/2012 | Andersson | F16L 5/08 277/606 |
| 2012/0032036 | A1 * | 2/2012 | Andersson | F16L 5/14 248/74.1 |
| 2016/0018025 | A1 * | 1/2016 | Beele | H02G 3/0456 248/68.1 |
| 2017/0354836 | A1 | 12/2017 | Lopes et al. | |
| 2018/0031396 | A1 * | 2/2018 | Bohlin | G01D 9/005 |
| 2020/0102736 | A1 | 4/2020 | Cosley et al. | |
| 2020/0274341 | A1 | 8/2020 | Petersson | |
| 2022/0129596 | A1 * | 4/2022 | Sträng | G06Q 10/10 |
| 2023/0075726 | A1 * | 3/2023 | Donahue | F16K 27/0236 |
| 2023/0220932 | A1 * | 7/2023 | Gibson | H02G 3/22 52/220.8 |

FOREIGN PATENT DOCUMENTS

| | | | | |
|---|---|---|---|---|
| EP | 3346172 | A1 | | 7/2018 |
| EP | 3660373 | A1 | | 6/2020 |
| JP | 03129179 | A | * | 6/1991 |
| JP | 2011163553 | A | | 8/2011 |
| JP | 2012122524 | A | | 6/2012 |

OTHER PUBLICATIONS

Written Opinion of the International Searching Authority for PCT/SE2022/050549 mailed on May 12, 2022 (11 pages).

Swedish Search Report mailed on Feb. 7, 2022 for Patent Application No. 2150721-5 (2 pages).

* cited by examiner

TRANSIT DEVICE FOR LEADING ONE OR MORE CABLES AND/OR PIPES THROUGH AN OPENING IN A PARTITION

This application is a National Stage Application of PCT/SE2022/050549, filed on 3 Jun. 2022, which claims the benefit of Serial No. 2150721-5, filed on 8 Jun. 2021, in Sweden, and which applications are hereby incorporated by reference in their entireties. To the extent appropriate, a claim of priority is made to each of the above disclosed applications.

TECHNICAL FIELD

The present invention is related to a transit device for leading one or more cables and/or pipes through an opening in a partition. Transit devices of this type comprise an extension frame with a central, axially extending opening. Such transit devices are used for leading cables and/or pipes through walls or other types of partitions. Transit devices of this type may also comprise a mounting frame with a central, axially extending opening, wherein the mounting frame can be connected to the partition.

BACKGROUND

Different types of transit devices is used to lead cables and/or pipes through a wall or other partition. To give a sealed transit some kind of seal is generally placed inside a mounting frame placed in an opening in the partition. One example of seals comprises a number of compressible modules, wherein each such module is to receive a cable or pipe. Such compressible modules are normally received side by side in one or more rows together with a compression unit inside the mounting frame. By means of the compression unit the compressible modules are compressed in one direction in such a way that the compressible modules will seal inwards around the cables and/or pipes and outwards against the inside of the mounting frame.

Transit devices for cables and pipes are used in many different environments, such as for cabinets, technical shelters, junction boxes and machines. They are used in different industrial environments, such as automotive, telecom, power generation and distribution, as well as marine and offshore. They may have to seal against fluid, gas, fire, rodents, termites, dust, moisture etc. and many receive cables for electricity, communication, computers etc. or pipes for different gases or liquids such as water, compressed air, hydraulic fluid and cooking gas.

For many transit devices there are demands of fire performance and it is common to place some kind of fire protection inside the transit device. It is well known in this technical field to use intumescent material as a fire protection. Intumescent material is a material that swells when exposed to excessive heat, such as in case of fire. The intumescent material may function as insulation material for the cables when a fire occur.

One prior art transit device comprises an extension frame having an axially extending through opening for cables and/or pipes. The extension frame is provided with one or more strips of intumescent material and a number of holes going through walls of the extension frame. The holes of the extension frame placed on a fire side will improve the reaction time of the intumescent material. Thereby the intumescent material can react as fast as possible and by that start to act as an insulation around the cables. The holes of the extension frame on the non-fire side will ventilate the frame and thereby cool the cables. Thus, the holes have different purpose depending on which side of the wall the extension frame is placed.

One problem with transit devices of prior art is that they cannot be used in different applications for different types of cables and/or pipes. Hence, one problem with transit devices of prior art is that they are limited in use and they may be inefficient to install depending on the application at hand.

SUMMARY

In view of the above one object of the present invention is to provide a transit device that provides for efficient installation. According to a first aspect of the present invention, one object is to provide a flexible transit device that works in a large number of applications. According to a second aspect of the present invention, one object is to provide a transit device with improved fire protection.

According to the first aspect, the present invention is related to a transit device for leading one or more cables and/or pipes through an opening in a partition, wherein the transit device comprises an extension frame connectable to a mounting frame and/or the partition and having an axially extending through opening for the cables and/or pipes, characterised in that the extension frame comprises a plurality of extension frame modules, each extension frame module having a first end, a second end and axially extending edge portions extending between the first end and the second end, the axially extending edge portions are provided with connection elements, wherein the extension frame modules are connectable to each other through the connection elements to form the extension frame, and the first end of said extension frame modules is provided with a fastening element for fastening to the mounting frame and/or the partition. Hence, a versatile modular transit device is achieved, which can be adapted to different applications in an efficient, reliable and cost efficient manner. In addition, the structure of the transit device allows for a lightweight construction and easy installation. The transit device can comprise the mounting frame, wherein the extension frame is connected to the mounting frame and/or the partition and extends in the axial direction from or away from the mounting frame.

Each of the axially extending edge portions can be provided with connection elements. For example, each extension frame module comprises three axially extending walls and four axially extending edge portions, two of which are free edge portions. Hence, extension frame modules can be connected to each other. For example, free edges of two adjacent extension frame modules can be connected to each other to form an extension frame. Simultaneously, adjacent extension frames can be connected to each other. In addition, the extension frame modules can be identical, which allows for simple and cost-efficient production and easy installation.

The connection elements can comprise a hook portion for connection to a hook portion of an adjacent extension frame module through a locking element, such as a form-fit lock in the form of a strip or clip enclosing one or more connecting elements of two adjacent extension frame modules. Hence, simple and cost efficient production of the connection elements is achieved as the hook portion can be folded in the free edge portions and punched and folded in the other edge portions, so that the extension frame modules can be arranged in sheet metal, such as a single sheet of sheet metal, by folding and punching.

Each extension frame module can be provided with one or more strips of intumescent material, which may be aligned with corresponding strips of an adjacent extension frame module. Hence, a fire retardant transit may be achieved by means of the transit device in an efficient manner. The strip(s) of intumescent material may be placed next to at least one row of at least partially unobstructed holes, so that the ventilation on a non-fire side is achieved for cooling purposes while quick response to heat is achieved on a fire side of the partition. The holes of the extension frame placed on the fire side will improve the reaction time of the intumescent material. Thereby the intumescent material can react fast and by that start to act as an insulation around the cables. The holes of the extension frame on the non-fire side will ventilate the frame and thereby cool the cables. Thus, the holes have a double function with different purpose depending on which side of the wall the extension frame is placed.

The mounting frame may comprises a plurality of mounting frame modules connectable to each other for forming the mounting frame. Hence, both the extension frame and the mounting frame may be modular for assembling a suitable transit device.

Each mounting frame module can be provided with a removable cover, which is to be removed before installation of cables and/or pipes. The cover may prevent debris, liquid, etc. from entering the transit device before installation of the cables and/or pipes. The cover may also be arranged for fire protection. For example, the cover may be of a fire resistant material, such as a plastic material comprising a flame retardant and may also contain fibre reinforcement, such as glass fibre reinforcement. The cover can be connected to the frame through a breakable peripheral notch and may be formed breakable diagonal and/or crossing notches extending from the breakable peripheral notch to a free edge of the cover to provide efficient removal of the cover.

The extension frame can be provided with a plurality of individually displaceable elements being displaceable from a first position, in which first position the displaceable elements extend in a direction radially inward, to a second position, in which second position the displaceable elements extend at least partially in a direction along the extension frame. The displaceable elements result in a barrier to prevent unwanted access to the extension frame and to prevent undesired material to enter the extension frame, wherein the displaceable elements improve the fire protection of the transit device. One or more displaceable elements can be displaced, such as bent by hand, in an easy manner for installation of cables and/or pipes. Hence, the displaceable elements may be formed in sheet metal and may be formed together with the extension frame modules, e.g. from a single sheet of sheet metal, e.g. by folding and punching.

According to the second aspect the present invention is related to a transit device for leading one or more cables and/or pipes through an opening in a partition, wherein the transit device comprises an extension frame connectable to a mounting frame and/or the partition and having an axially extending through opening for the cables and/or pipes, characterised in that the extension frame is provided with a plurality of individually displaceable elements being displaceable from a first position, in which first position the displaceable elements extend in a direction radially inward, to a second position, in which second position the displaceable elements extend at least partially in a direction along the extension frame. The displaceable elements result in a barrier to prevent unwanted access to the extension frame and prevent undesired materials from entering into the extension frame. In case of fire, the pipes or cables may lead heat through the partition so that combustible materials present in contact with or in the vicinity of the cables or pipes close to the partition may ignite by the heat. The displaceable elements reduce the risk that such combustible materials enter the extension frame. One or more displaceable elements can be displaced, such as bent by hand, in an easy manner for installation of cables and/or pipes. The displaceable elements may be formed in sheet metal and may be formed together with the extension frame, e.g. by folding and punching, and e.g. from a single sheet of sheet metal. The transit device can comprise the mounting frame, wherein the extension frame is connected to the mounting frame and/or the partition and extends in the axial direction from or away from the mounting frame.

A first end of the extension frame can be connected to the mounting frame and/or the partition and a second end of the extension frame can be provided with the displaceable elements. Hence, the displaceable elements, in the first position, may at least partially block an axially extending opening of the extension frame at the second end.

The transit device according to the second aspect can be combined with the embodiments according to the first aspect as described above and in more detail below with reference to the appended drawings. Further objects and advantages of the present invention will be obvious to a person skilled in the art when reading the detailed description below.

BRIEF DESCRIPTION OF THE DRAWINGS

The invention will be described further below by way of embodiment examples and with reference to the enclosed drawings, in which.

DETAILED DESCRIPTION

Figures 1, 2, 3:
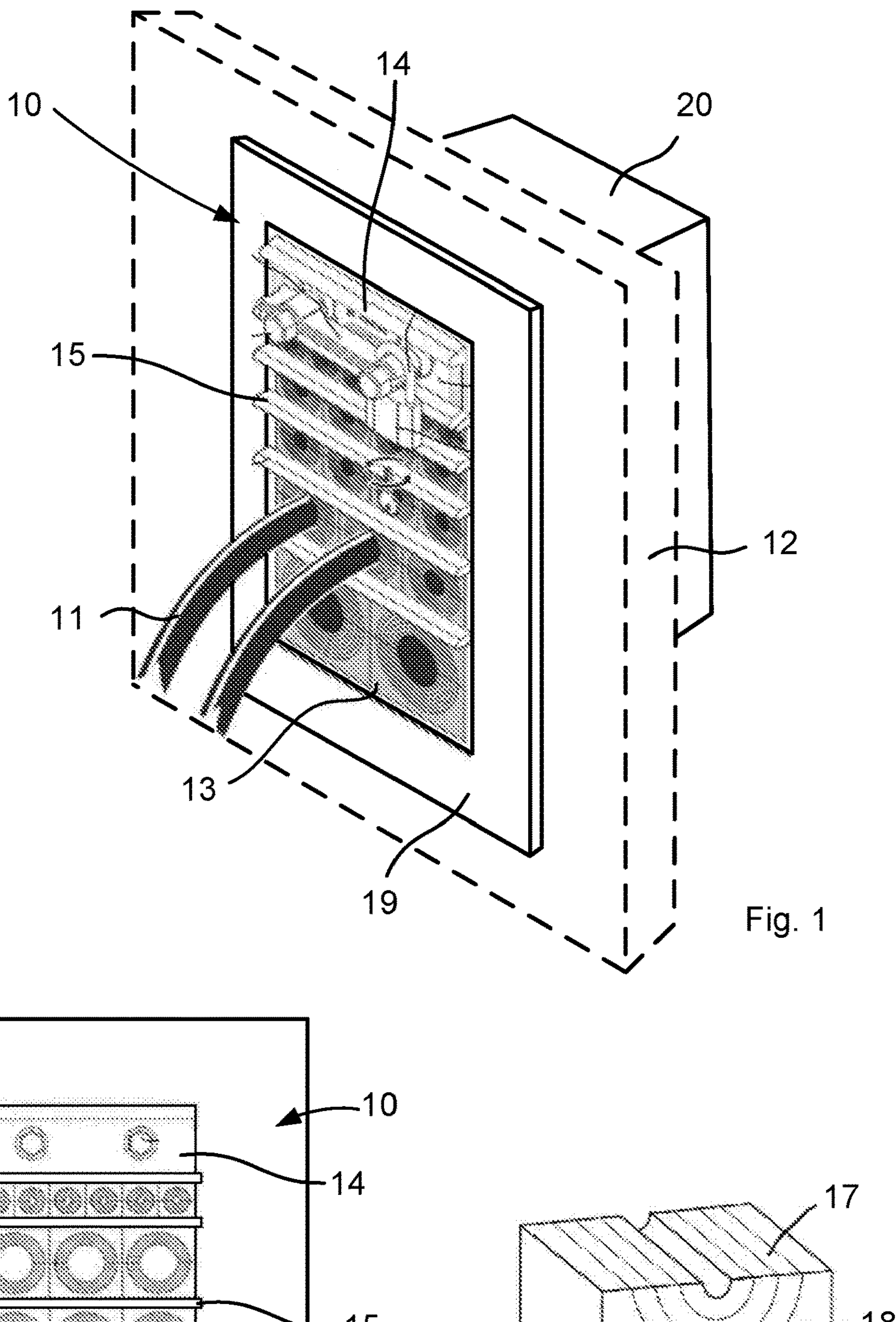
FIG. 1 is a schematic perspective view of a transit device according to one embodiment, which transit device is arranged in a partition in the form of a wall and provided with sealing modules, stayplates and a compression unit.
FIG. 2 is a schematic front view of a transit device according to one embodiment, which transit device is provided with sealing modules, stayplates and compression unit.
FIG. 3 is a schematic perspective view of a sealing module half for a transit device according to one embodiment.

With reference to FIG. 1, a transit device 10 for passing at least one cable 11 and/or at least one pipe through a partition 12 is illustrated schematically according to one embodiment. The transit device 10 is arranged for passing one or more cables 11 and/or pipes through a partition 12 in the form of a wall, a floor, a roof or a ceiling. The partition 12 is illustrated by means of dashed lines in FIG. 1. For example, the transit device 10 is arranged to be mounted in a partition 12 comprising studs provided with a panel, such as construction boards of gypsum, wood or similar. For example, the transit device 10 is arranged for passing cables 11, such as cables for electricity, communication, computers etc., or pipes for different gases or liquids, such as water, compressed air, hydraulic fluid, cooking gas or other types of liquids or gases. Cables and/or pipes are led in an axial direction through the transit device 10.

The transit device 10 according to FIG. 1 is arranged for receiving one or more sealing modules 13, a compression unit 14 and optionally stayplates 15. The sealing modules 13 may be arranged in different sizes and a plurality of different sealing modules 13 may be arranged in different configurations, which is illustrated also with reference to FIG. 2. For example, the sealing modules 13, the compression unit 14 and the stayplates 15, if applicable, are of conventional type. For example, the sealing modules 13 are resilient and comprises two opposite sealing halves 16, wherein each module half 16 comprises a plurality of peelable sheets 17 placed in a semi-cylindrical groove 18 as illustrated in FIG. 3. Optionally, a suitable number of peelable sheets 17 are removed to adapt the sealing module 16 to the diameter of the cable or pipe, wherein the cable 11 or pipe is placed in the module half 16 and a sealing module 13 is formed by placing two module halves 16 on top of each other. For example, the compression unit 14 is a conventional wedge.

Figure 4:
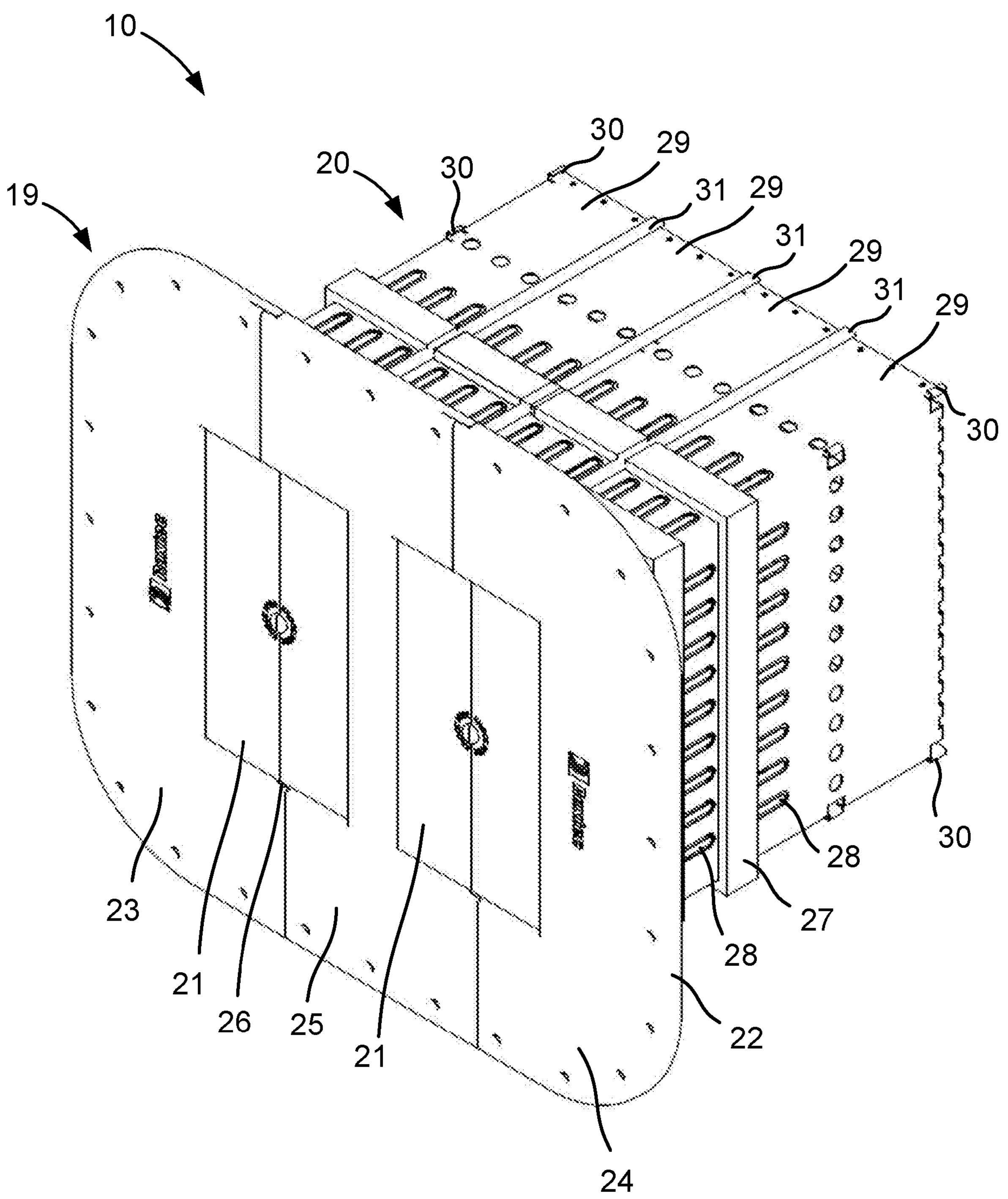
FIG. 4 is a schematic perspective view of a transit device according to a first embodiment of the present invention, illustrating a mounting frame and an extension frame, wherein the mounting frame is formed by a first end module, a second end module and an optional intermediate module, and wherein the extension frame is formed by extension frame modules.
Figure 5:
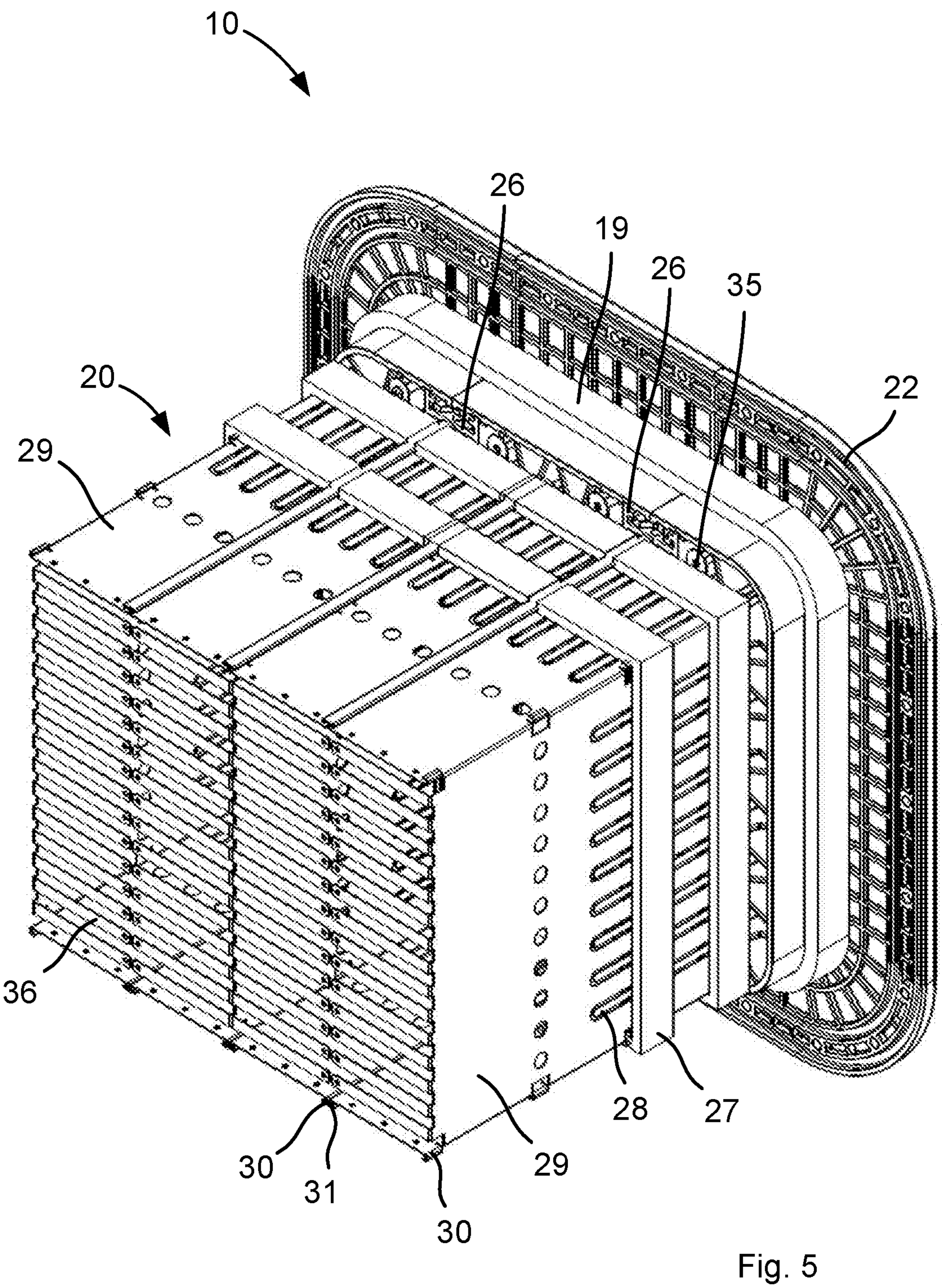
FIG. 5 is a schematic perspective view of the transit device of FIG. 4 from the opposite direction.

With reference to FIGS. 4 and 5 the transit device 10 comprises a mounting frame 19 and an extension frame 20. The mounting frame 19 is arranged for receiving one or more compressible sealing modules 13 in a central, axially extending opening through which opening the one or more cables and/or pipes can be arranged. In FIG. 4, said opening is covered by an optional and removable cover 21, which will be described more in detail below. For example, the opening of the mounting frame 19 is arranged to be sealingly filled with sealing modules 13 and one or more compression units 14 and optionally one or more stayplates 15. For example, the mounting frame 19 is formed in plastic materials, such as fiber reinforced plastic materials. For example, the mounting frame 19 is made of polyamide, such as glass fiber reinforced polyamide. Hence, the mounting frame 19 may be lightweight and suitable for mounting in a panel wall, such as a wall comprising girders and panel of gypsum boards or similar building materials. In the illustrated embodiment, the mounting frame 19 comprises a flange 22 for fastening of the transit device 10 to the partition 12, such as through screws or other conventional fastening means (not illustrated). For example, the flange 22 is arranged with holes for receiving screws. The extension frame 20 may extend away from the mounting frame 19 and the partition. Alternatively, the extension frame may extend through the opening in the partition 12 as illustrated in FIG. 1.

In the illustrated embodiment, the mounting frame 19 is a modular mounting frame, wherein the mounting frame 19 comprises first and second end modules 23, 24 and optionally also one or more intermediate modules 25 arranged between the end modules 23, 24. For example, each of the first and second end modules 23, 24 comprises three wall portions, wherein two wall portions are opposite each other and connected to each other in one end through another wall portion. For example, the first and second end modules 23, 24 are identical. The intermediate module 25 comprises opposite wall portions connected to each other by a centrally arranged wall portion. The first and second end modules 23, 24 are connectable to each other or to an intermediate module 25 through a form-fit locking device 26, which will be described more in detail below. In FIG. 4, the end modules 23, 24 and the intermediate module 25 form two openings for cables and/or pipes, which in the drawing are arranged next to each other in parallel and are covered by removable covers 21.

The extension frame 20 is connected to the mounting frame 19 and extends in the axial direction from the mounting frame 19. The extension frame 20 and the mounting frame 19 form an axially extending opening through the mounting frame 19 and the extension frame 20, wherein one or more cables and/or pipes can be arranged in the opening through the extension frame 20 and the mounting frame 19, e.g. after removal of the optional cover 21.

At least one strip of intumescent material 27 is placed on the inner and/or outer circumference of the extension frame 20. The strip of intumescent material 27 is, e.g. attached to the surface of the extension frame 20 by an adhesive. However, it has been found that such an adhesive may be unreliable, for example at elevated temperatures. In the illustrated embodiment, the extension frame 20 is arranged with foldable tabs 28, which are foldable over the strip of intumescent material 27 for clamping it in place. Hence, the strip of intumescent material 27 is secured by means of the tabs 28 with our without any adhesive. The tabs 28 are distributed around the circumference of the extension frame 20. In the illustrated embodiment, the tabs 28 are arranged in a row going around the circumference of the extension frame 20 next to the strip of intumescent material 27. For example, the tabs 28 in a row are arranged with equal spacing. The tabs 28 are, e.g. foldable over the strip of intumescent material by hand or by means of a hand-held tool. In the illustrated embodiment, the tabs 28 are punched out in the extension frame 20, wherein folding of the tabs 28 leaves corresponding through holes in the extension frame 20. When fastened by the tabs 28, the strip of intumescent material 27 is placed next to the holes, so as not to cover said holes. For example, one or more strips of intumescent material 27 is/are placed around the inner and/or outer circumference of the extension frame 20 next to one such row tabs 28. Hence, the tabs 28 may be foldable inward and/or outward for clamping a strip of intumescent material 27 on either side. Alternatively, the extension frame 20 is arranged without the tabs 28 and is instead formed with corresponding holes arranged around the circumference of the extension frame 20. When the tabs 28 have been bent for holding the strip of intumescent material 27 the resulting through holes in the extension frame 20 may provide ventilation for cooling the cables and or pipes in case of fire on the other side of the partition.

According to a first aspect of the present invention the extension frame 20 comprises a plurality of extension frame modules 29 connectable to each other through connection elements 30 to form the extension frame 20. In the illustrated embodiment, extension frame modules 29 are connectable to each other through the connection elements 30 and a locking element 31, such as a form-fit lock. Alternatively, the connection elements 30 are connected directly to each other. In FIG. 4, four extension frame modules 29 are illustrated, which are connected to each other by means of the connection elements 30 and three locking elements 31, wherein the locking elements 31 cover the connection elements 30 in use.

With reference also to FIGS. 6-8 and 12-13, each extension frame module 29 comprises a first end, a second end and axially extending edges extending from the first end to the second end. Each extension frame module 29 comprises three walls 32-34, wherein first and second walls 32, 33 are opposite each other and connected to each other through a third wall 34. The first and second walls 32, 33 extend perpendicularly from the third wall 34. For example, the extension frame module 29 has a U-shaped profile. Hence, the extension frame module 29 comprises two opposite and axially extending free edges and two opposite and axially extending edges connected to the third wall 34. According to one embodiment, the extension frame modules 29 are identical.

The axially extending edges are provided with the connection elements 30. For example, each connection element 30 is arranged to be connected to a connection element 30 of an adjacent extension frame module 29, e.g. through the locking element 31. In the illustrated embodiment, each connection element 30 comprises a hook portion for connection to the corresponding connection element 30 of an adjacent extension frame module 29 through the locking element 31. For example, the locking element 31 is a form-fit lock, such as a strip or clip, enclosing connecting elements 30 of adjacent extension frame modules 29.

Figure 7:
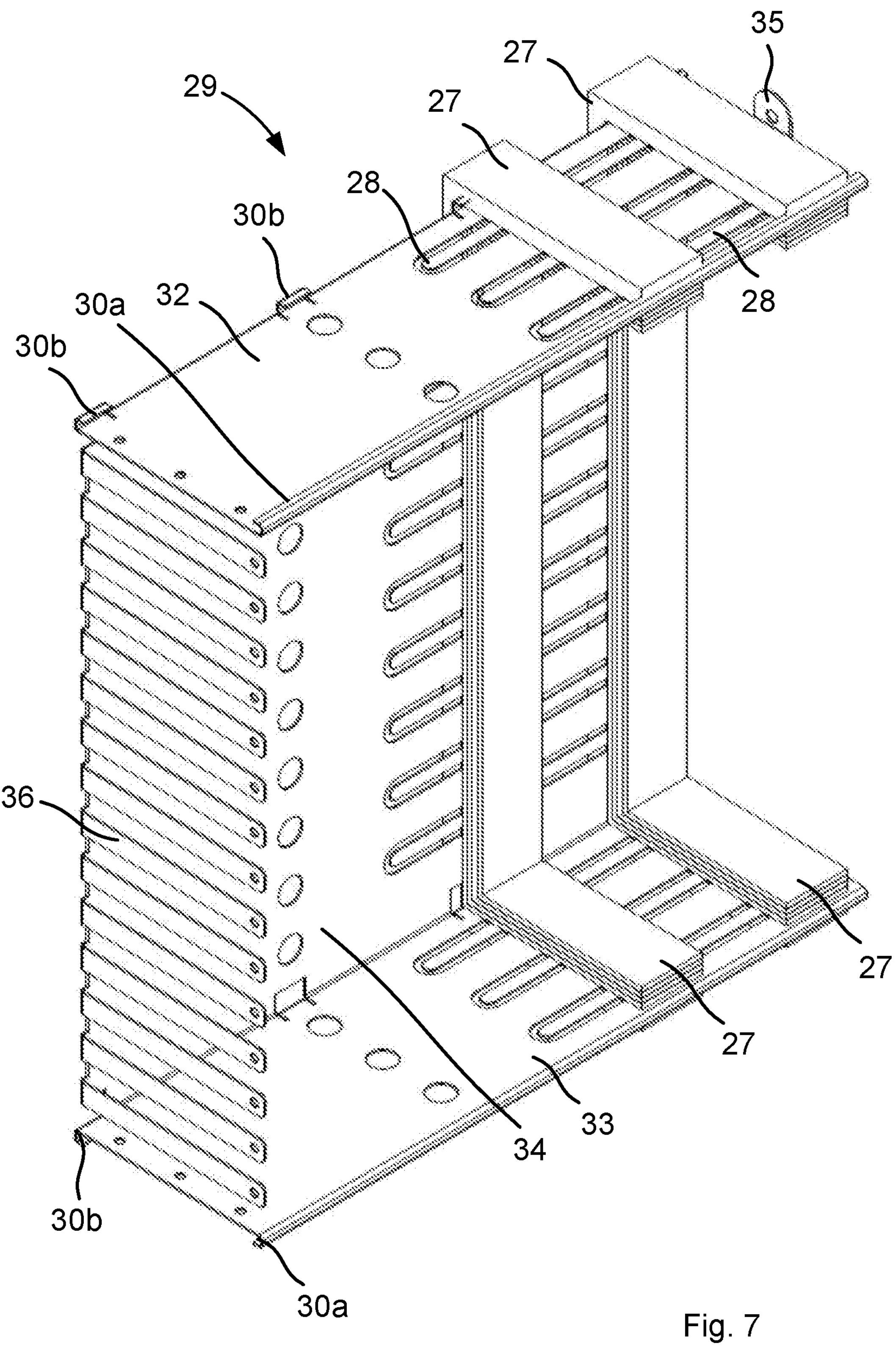
FIG. 7 is a schematic perspective view of the extension frame module of FIG. 6.
Figure 8:
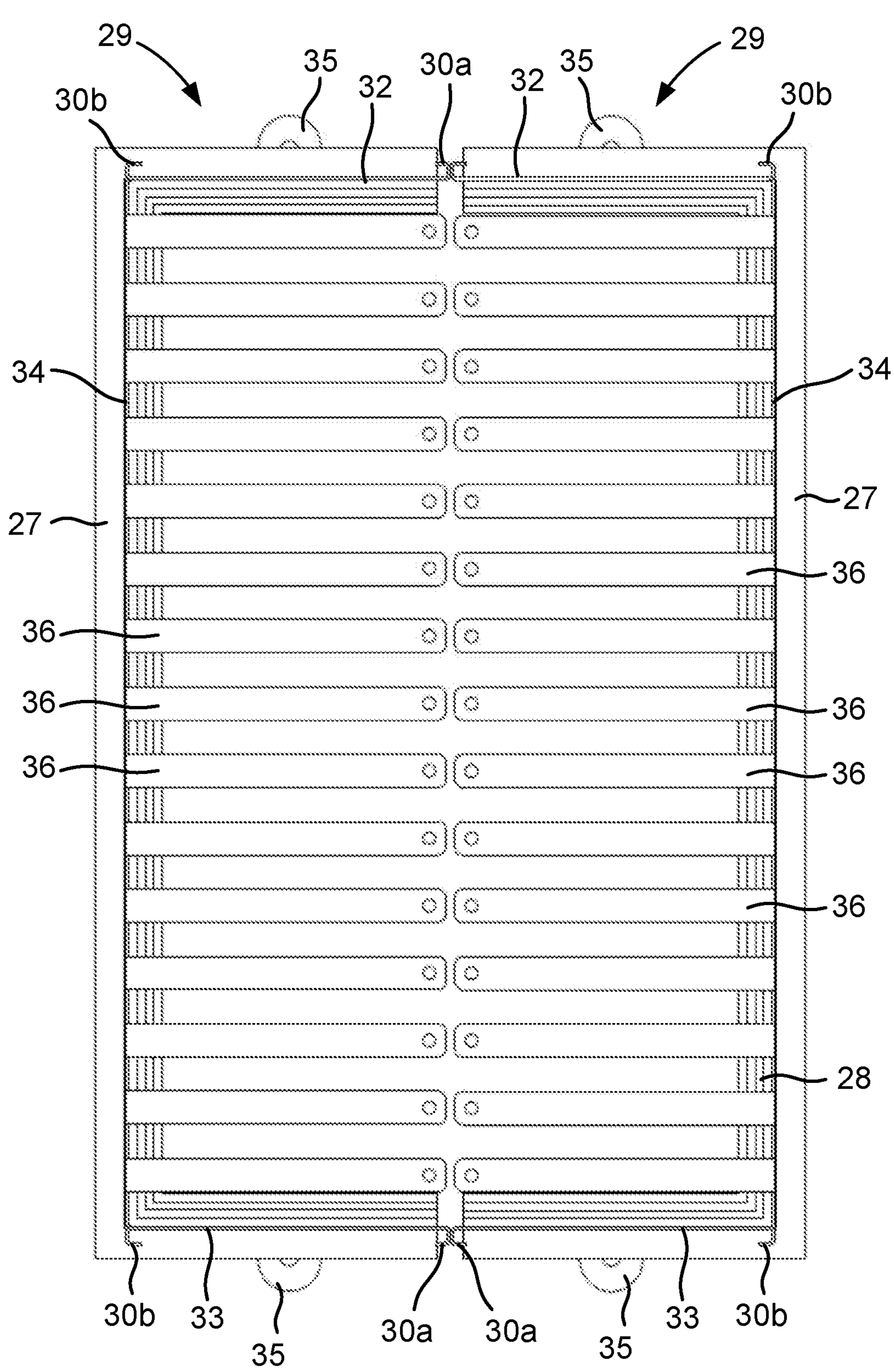
FIG. 8 is a schematic end view of two extension frame modules, illustrating connection elements of the extension frame modules connected by a form-fit lock according to one embodiment.

With reference to FIG. 7, the axially extending free edges of each extension frame module 29 are provided with a first connection element 30*a*, wherein the other axially extending edges are provided with second connection elements 30*b*. The first and second connection elements 30*a*, 30*b* are formed as hook portions extending away from each other. In the illustrated embodiment, the first connection elements 30*a* are continuous hook portions formed by folding the axially extending free edges of the extension frame module 29, wherein the second connection elements 30*b* are formed by cutting and folding tabs intermittently along the axially extending edges connected to the third wall 34. Hence, two extension frame modules 29 can be arranged with the first and second walls 32, 33 toward each other and connected by means of the first connecting elements 30*a* and the locking element 31. In addition, another extension frame module 29 can be arranged with its third wall 34 facing the third wall 34 of an adjacent extension frame module 29, wherein the extension frame modules are connected to each other through the second connecting elements 30*b* and a locking element 31 as illustrated in FIGS. 4 and 5.

The first end of each extension frame module 29 is provided with a fastening element 35. In the embodiment according to FIGS. 6-8 the fastening element 5 is arranged for fastening to the mounting frame 19, wherein the extension frame 20 is attachable to the mounting frame 19. In the illustrated embodiment, the fastening element 35 is a tab with a through hole for receiving a screw, so that the extension frame modules 29 can be fastened to the mounting frame 19 by means of screws. Alternatively, the fastening element 35 is a form-fit fastening element, such as a hook, a pin with a head or similar element having a shape cooperating with a corresponding recess for fastening.

Each extension frame module 29 is provided with the holes and the one or more strips of intumescent material 27, which are arranged to be aligned with corresponding rows of holes and strip(s) of intumescent material 27 of an adjacent extension frame module 29. Hence, when two extension frame modules 29 are put together to form the opening for cables and/or pipes, the strips of intumescent material 27 of two adjacent extension frame modules 29 together extend around the inner circumference of the extension frame 20 and optionally also around the outer circumference thereof.

In the embodiments of FIGS. 4-8 and 12-15, the extension frame 20 is provided with a plurality of individually displaceable elements 36. The displaceable elements 36 are displaceable from a first position, in which they extend in a direction radially inward, to a second position, in which they extend at least partially in a direction along the extension frame 20. The displaceable elements 36 may be arranged to provide a screen to prevent unwanted access to the interior of the transit device 10 from one end. Hence, the displaceable elements 36, when in the first position, may at least partially block the axially extending opening in the extension frame.

In the illustrated embodiments, the displaceable elements 36 are arranged in an end of the extension frame 20 opposite the mounting frame 19. Hence, a first end of the extension frame 20 is connected to the mounting frame 19 and a second end of the extension frame 20 is provided with the displaceable elements 36. Alternatively, the first end of the extension frame 20 is connected directly to the partition 12 and the second end of the extension frame 20 is provided with the displaceable elements 36. Each displaceable element 36 is elongated and comprises a first end and a second end. The first end of the displaceable element 36 is connected to the extension frame 20 in a connecting portion, wherein the displaceable element 36 is displaceable around the connecting portion from the first position to the second position. Hence, the displaceable element 36 can be turned or bent in the connecting portion from the first position to the second position. For example, the displaceable elements 36 are formed in relatively thin sheet metal, so that they can be bent by hand from the first position to the second position. Hence, the displaceable elements 36 may be formed as bendable elongated fingers connected to the end of the extension frame 20. According to one embodiment, the walls 32-34 and the displaceable elements 36 are formed in sheet metal. At least one wall of the extension frame 20 is arranged with displaceable elements 36 or at least two walls, such as two opposing walls, thereof are arranged with displaceable elements 36.

The second end of the displaceable elements 36 may be a free end. Alternatively, the second end of each displaceable element 36 contacts or is connected to an opposite wall of the extension frame 20, or contacts or is connected to opposing displaceable elements 36 extending from the opposite wall of the extension frame 36, wherein the second end may be connected to the opposite wall or displaceable element 36 through a breakable notch, which may be breakable by hand.

In the illustrated embodiments, the displaceable elements 36 are arranged on the third wall 34 of each extension frame module 29. Alternatively, the displaceable elements 36 are arranged on opposite walls of a non-modular extension frame 20. Alternatively, the displaceable elements 36 are arranged on the opposite first and second walls 32, 33 of the extension frame modules 29. For example, the displaceable elements 36, in the first position, extend perpendicular to the extension frame 20, such as perpendicular to the third wall 34 as illustrated. Hence, the displaceable elements 36 extend in a plane perpendicular to the axial direction and may also extend perpendicular to the first, second and third walls 32-34. In the illustrated embodiments, the displaceable elements 36 are distributed in a plane with a spacing to form a gap between displaceable elements 36 extending from the same wall. For example, the gap substantially corresponds to a width of the displaceable element 36.

When cables and/or pipes are led through the transit device 10, or when the transit device 10 is arranged around cables and/or pipes, the appropriate displaceable elements 36 are displaced from the first position to the second position to allow the cables and/or pipes to pass. Hence, one or more of the displaceable elements 36 in the desired positions are displaced so as not to obstruct the passageway for the cables and/or pipes going through the transit device 10.

Figure 9:
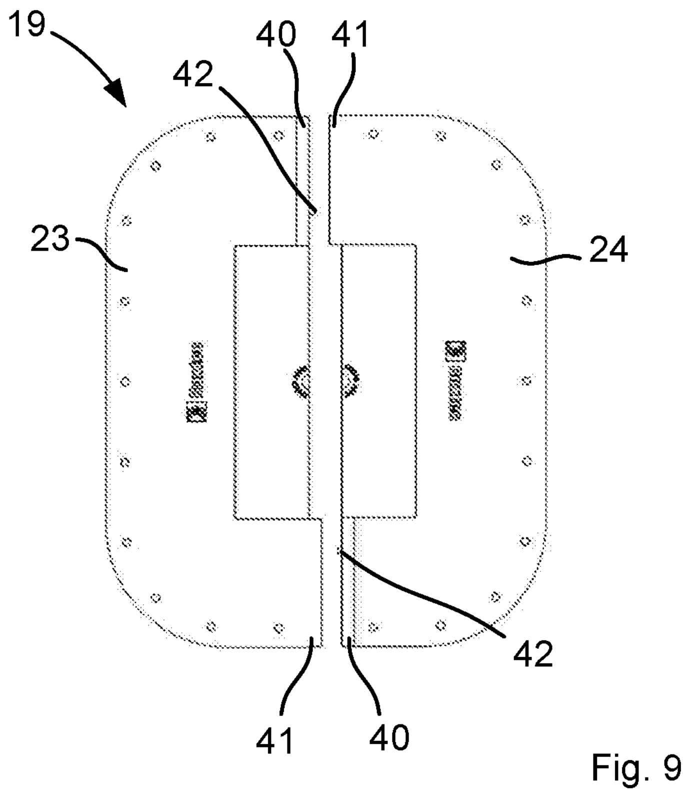
FIG. 9 is a schematic end view of two end modules of the mounting frame according to one embodiment.
Figure 10:
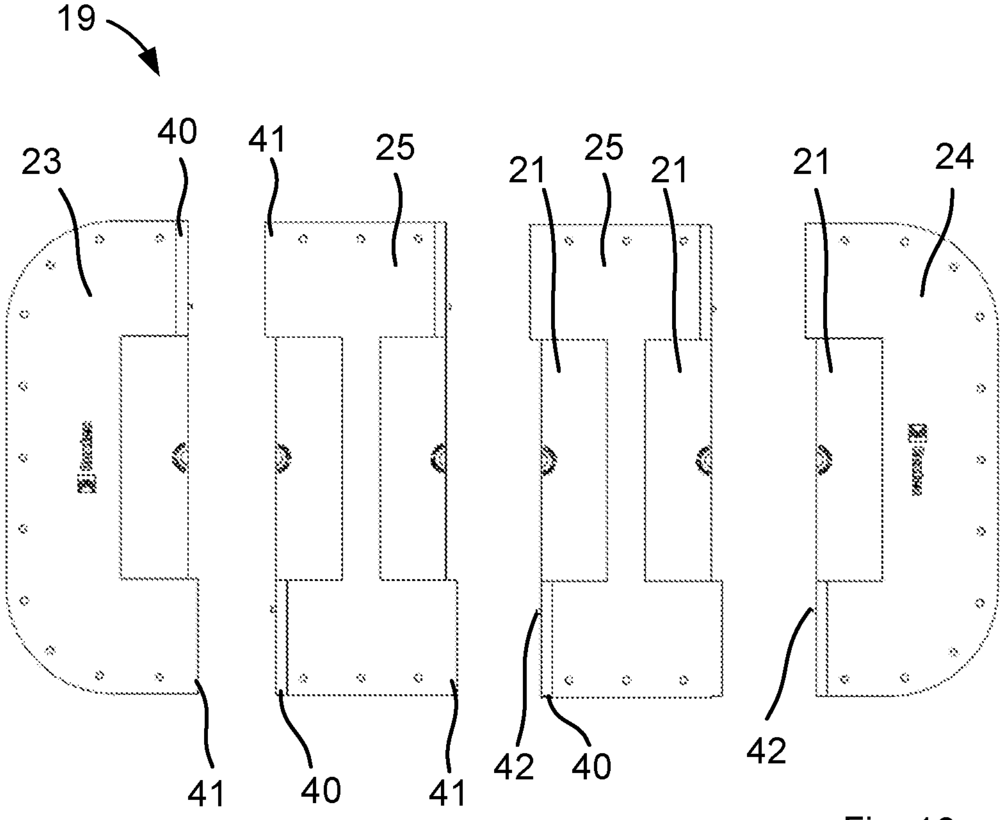
FIG. 10 is a schematic end view of two end modules and an intermediate module of the mounting frame according to another embodiment.
Figure 11:
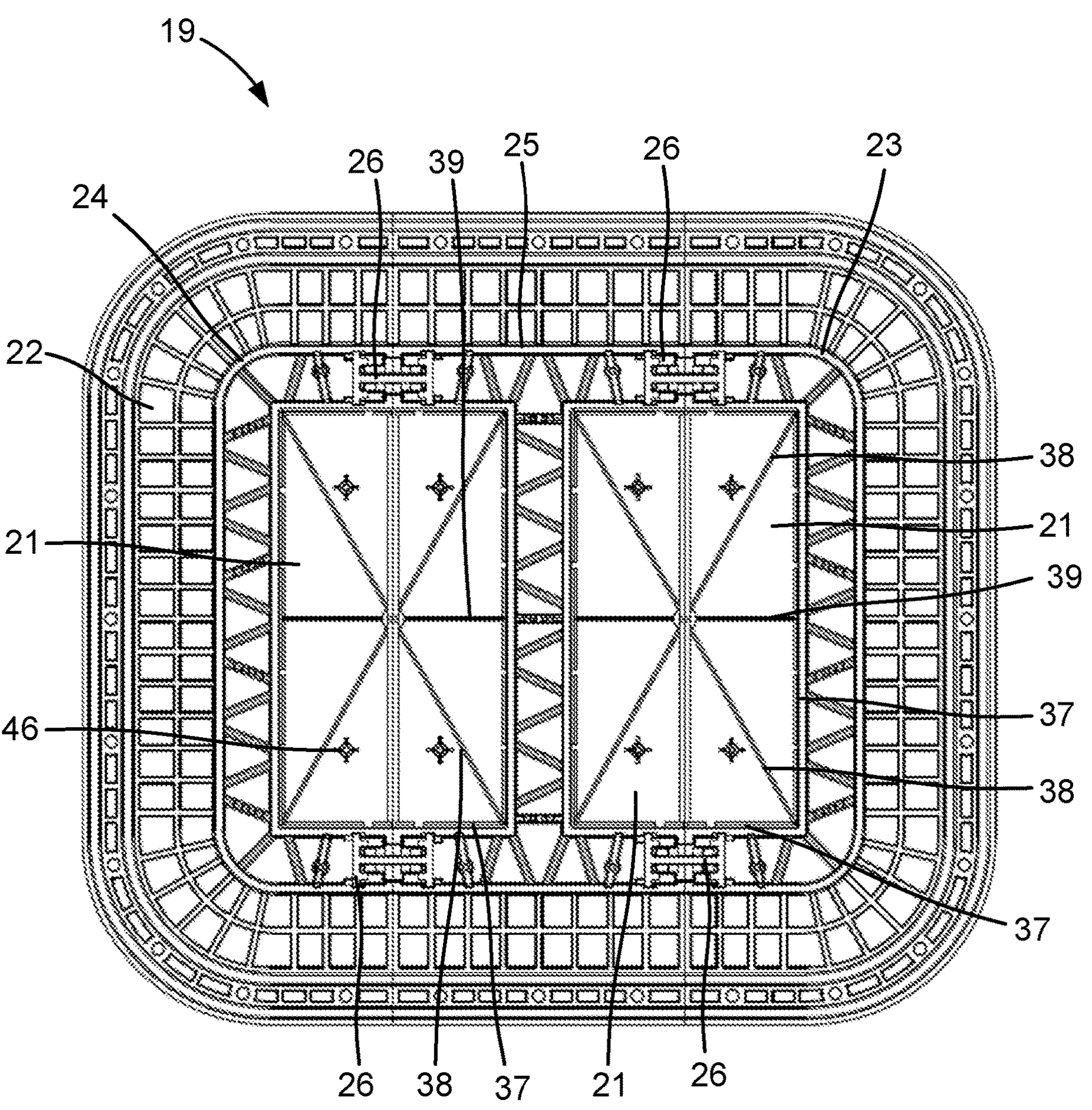
FIG. 11 is a schematic view of the mounting frame of FIG. 10 from the opposite direction.

With reference to FIGS. 9-11 the mounting frame 19 is illustrated according to various embodiments. In FIG. 9 the first end module 23 and the second end module 24 are illustrated, wherein the first end module 23 may be directly connected to the second end module 24. In FIG. 10, two intermediate modules 25 are arranged between the first and second end modules 23, 24, wherein the first end module 23 may be connected to the adjacent intermediate module 25, which may be connected to the adjacent intermediate module 25, which in turn may be connected to the second end module 24. For example, the transit device 10 may comprise one, two, three or any suitable number of intermediate modules 24.

In the embodiment of FIGS. 9-11, the first and second end modules 23, 24 and the intermediate module 25 of the mounting frame 19 are provided with the optional and removable covers 21 for covering the opening thereof before use of the transit device 10. For example, the cover 21 is an integrated part of the module 23-25 and is then connected to the remaining parts of the module 23-25. For example, the mounting frame modules 23-25 are made of plastic materials, such as fire retardant polyamide. The covers 21 may be connected to the first and second end modules 23, 24 and the intermediate module 25 through breakable peripheral notches 37. For example, each cover 21 is substantially rectangular and connected to an end module 23, 24 or intermediate module 25 through three peripheral notches 37. Hence, when the modules 23-25 are separated, the cover 21 is connected to the module 23-25 through three peripheral notches 37 leaving a free edge of each cover 21 which is to be facing or contacting the cover 21 of an adjacent module 23-25 (the free edge of the cover can be seen more clearly in FIGS. 9 and 10). Each cover 21 may also be formed with two breakable diagonal notches 38 extending between the periphery of the cover 21 and the free edge thereof. For example, each of the diagonal notches 38 extends from one of the breakable peripheral notches 37 to the free edge. In the illustrated embodiment, one diagonal notch 38 extends from each corner of the peripheral notch 37 to a centre of the free edge. Optionally, the cover 21 is also arranged with a crossing notch 39 extending between the centre portion of the free edge and a centre portion of the peripheral notch 37 opposite the free edge.

In FIG. 11 the form-fit locking device 26 for connection of the modules 23-25 of the mounting frame 19 are illustrated according to one embodiment. FIG. 11 illustrates the first end module 23 and the second end module 24 connected to one intermediate module 25 through four form-fit locking devices 26. However, as described above, any suitable number of intermediate modules 25 may be used. The form-fit locking device 26 is arranged as a profiled piece, e.g. of metal or plastic, to be inserted in a slot in each of the modules 23-25, wherein one portion of the form-fit locking device 26 is inserted in the slot of one module 23-25 and the remaining portion is inserted in the slot of the adjacent module 23-25. For example, the modules 23-25 are formed with corresponding slots, which are aligned and together form a combined slot, e.g. having a shape corresponding to the form-fit locking device 26, for receiving the form-fit locking device 26. According to the illustrated embodiment, the form-fit locking device 26 comprises opposite transverse portions connected by a connecting portion, wherein the transverse portions are arranged for preventing the modules 23-25 to be displaced away from each other while the connecting portion connects the transverse portions. For example, the slot extend in the axial direction, wherein the form-fit locking device 26 is inserted in the axial direction into the slot and prevents unintentional displacement of the modules 23-25 in relation to each other in a plane perpendicular to the axial direction.

Figure 6:
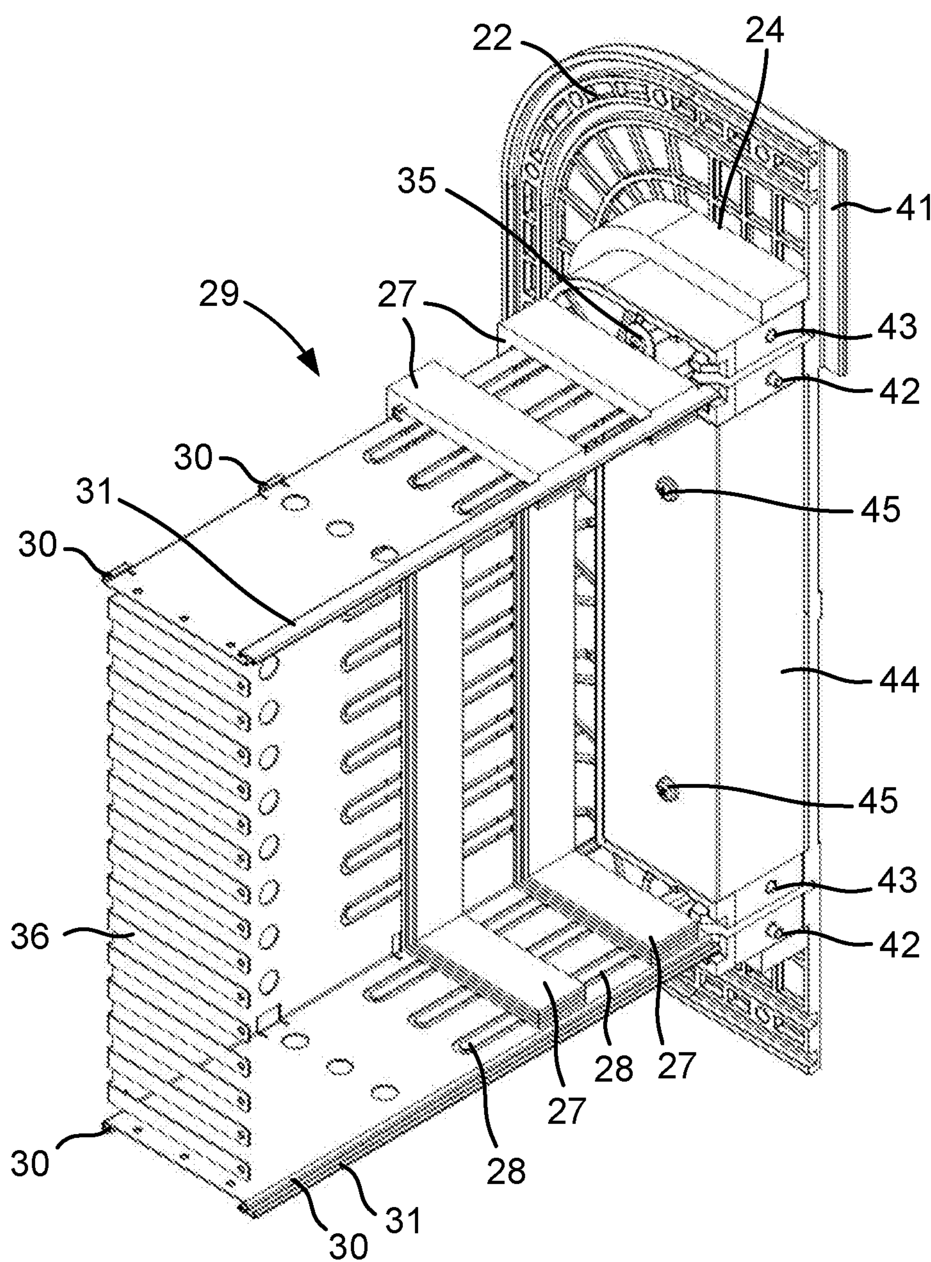
FIG. 6 is a schematic perspective view of the end module of the mounting frame and one extension frame module of FIG. 5, illustrating an interior of the extension frame module.

With reference to FIGS. 6, 9 and 10, the mounting frame modules 23-25 may also be arranged with cooperating recesses 40 and projections 41 forming an overlap to prevent unintentional displacement of the modules 23-25 in relation to each other in the axial direction. In addition, the modules 23-25 may comprise at least one protrusion 42, e.g. arranged as a pin, and at least one corresponding hole 43 for receiving the protrusion 42 of an adjacent module 23-25. For example, the protrusion 42 and the hole 43 extend in a direction perpendicular to the axial direction to prevent unintentional displacement of the modules 23-25 in relation to each other in the axial direction.

Referring back to FIG. 6, the transit device 10 is provided with an optional insulation element 44. For example, the insulation element 44 is arranged to provide improved fire protection and/or thermal insulation. According to one embodiment, the insulation element 44 is arranged as a block of insulating material, such as mineral or ceramic insulation. In the illustrated embodiment, the insulation element 44 is attached to the mounting frame 19 to insulate the opening formed by the mounting frame 19 for transition of cables and/or pipes. For example, the insulation element 44 is attached to the cover 21. Hence, the cover 21 of each mounting frame module 23-25 may be provided with the insulation element 44, wherein the mounting frame module 23-25 partly encloses the outer circumference of the insulation element 44 in the radial direction. When the mounting frame modules 23-25 are put together to form a mounting frame 19, insulation elements 44 of adjacent mounting frame modules 23-25 are put together and are enclosed by the mounting frame 19. The insulation element 44 may correspond to the shape and size of the cover 21. The insulation element 44 is removable from the cover 21, wherein the insulation element 44 can be removed first and then the cover 21 can be removed after, e.g. by breaking the breakable notches 37, 38, 39 as described above. In the illustrated embodiment, the insulation element 44 is detachably attached to the cover 21 by means of one or more screws 45 or other suitable mechanical fastening means. Alternatively, the insulation element 44 is removable together with the cover 21, e.g. through breakable notches in the insulation element 44, which may correspond to the peripheral notches 37 and/or the diagonal and crossing notches 38, 39 of the cover 21. The screws 45 are arranged from the same side as the extension frame 20, wherein screw heads of the screws 45 may be accessed through the extension frame 20, e.g. after bending displaceable elements 36 out of the way. Alternatively, the insulation element 44 is removed before mounting of the extension frame 20. With reference also to FIG. 11, the cover 21 is arranged with screw sleeves 46 for receiving the screws 45 to fasten the insulation element 44. The screw sleeves 46 project from one side of the cover 21, such as in the axial direction, and may be an integrated part of the cover 21. The screw sleeves 46 is, e.g. formed with internal threads for engaging threads of the screws 45. Hence, a transit device 10 for leading one or more cables 11 and/or pipes through an opening in a partition 12 is disclosed, wherein the transit device 10 comprises a mounting frame 19 having the removable insulation element 44. The insulation element 44 may be a stand-alone feature of a modular or non-modular mounting frame 19. Optionally, the mounting frame 19 comprises the mounting frame modules 23-25 as described above, wherein the insulation element 44 is attached to the cover 21 of each of the mounting frame modules 23-25 of a mounting frame 19, such as by means of the screws 45 cooperating with the screw sleeves 46. The transit device 10 with the removable insulation element 44 may optionally comprise the extension frame 20 comprising the extension frame modules 29 described above.

Figure 12:
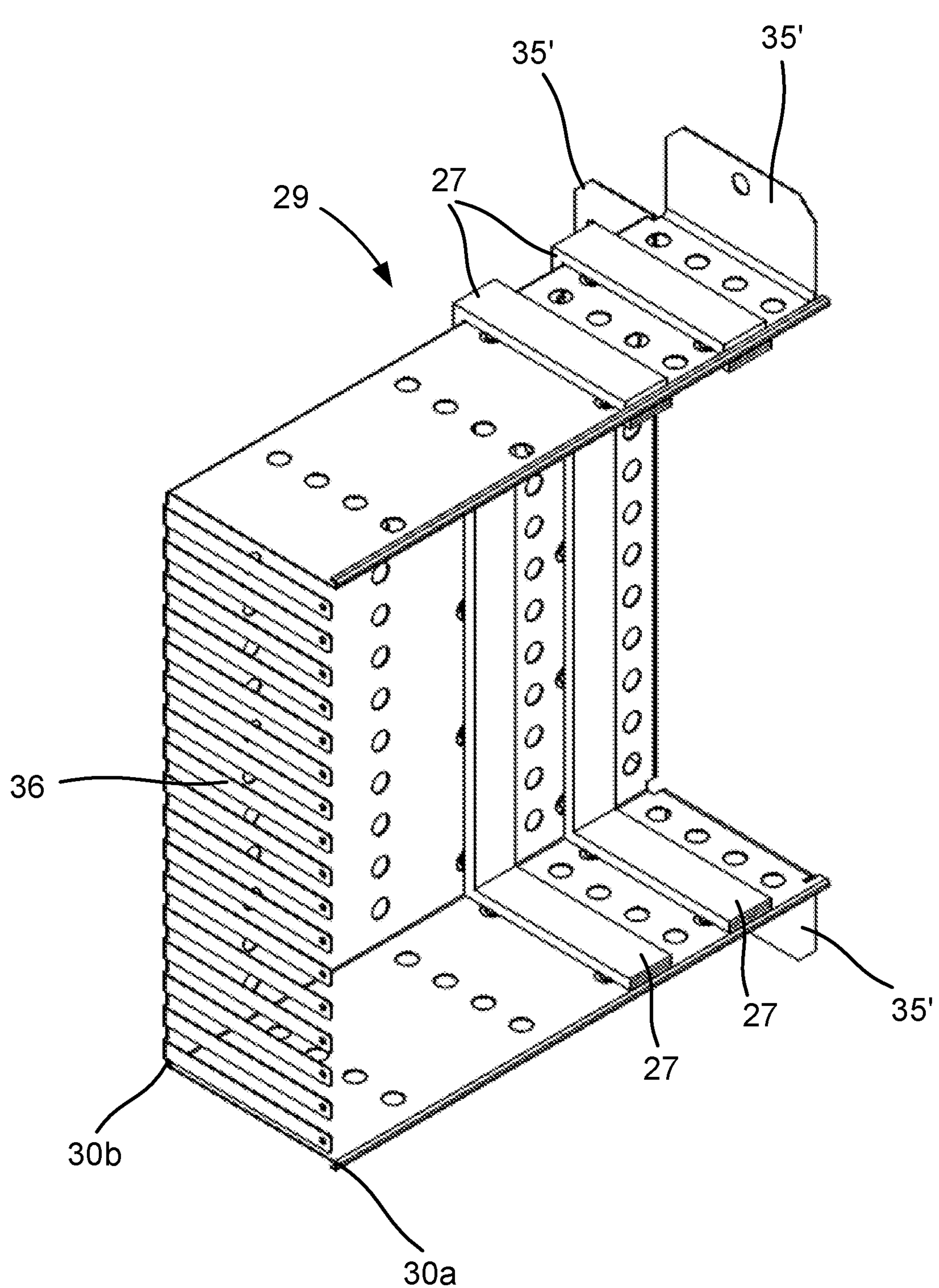
FIG. 12 is a schematic perspective view of an extension frame module according to one embodiment.

In FIG. 12, an extension frame module 29 is shown according to one embodiment, which is of similar structure as the one shown and described in relation to FIG. 7 with the difference that here, the first end of the extension frame module 29 is provided with a fastening element 35' for fastening to the partition 12 (see FIG. 13), such as directly to the partition 12. The fastening element 35' is shaped as a flange and has a through hole for receiving a fastener, such as a screw or other type of conventional fastening means (not illustrated), so that the extension frame module 29 can be fastened to a partition 12 by means of screws or the like. Optionally, the extension frame module 29 is fastened to the partition 12, see for instance FIG. 1 where the extension frame 20 and the mounting frame 19 are arranged on opposite sides of the partition 12.

Figure 13:
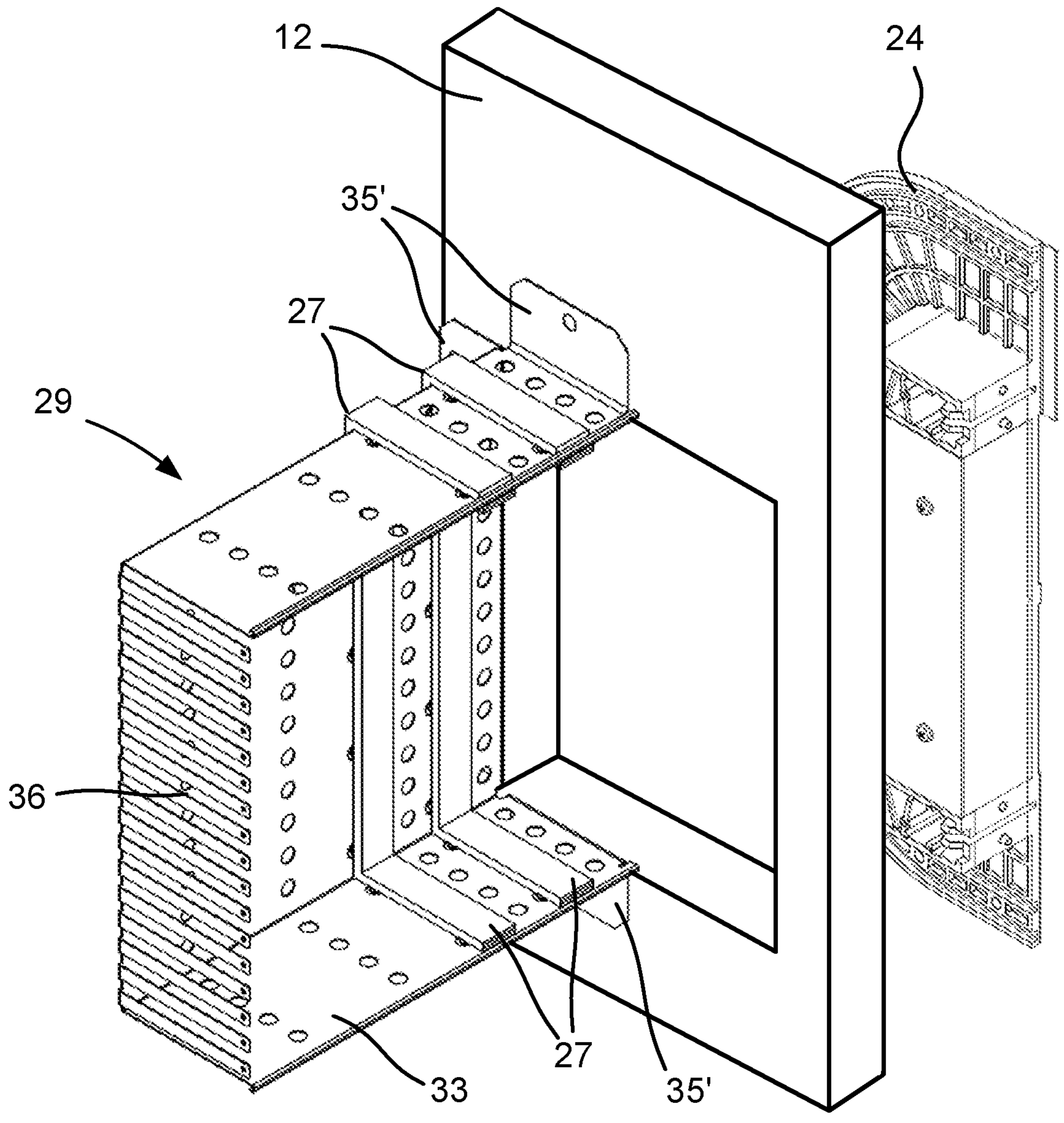
FIG. 13 is schematic perspective view of one end module of the mounting frame and one extension frame module on opposite sides of a partition according to an embodiment.

With reference to FIG. 13, an extension frame module 29 is mounted to a partition 12. The extension frame 20 as a whole, including several extension frame modules 29, is attachable to the partition 12 in the same manner. From the opposite side of the partition 12, the mounting frame 19 is attached to the partition 12. In FIG. 13, the second end module 24 is illustrated at a distance from the partition 12. The mounting frame 19 is, e.g. assembled and then arranged at the opening in the partition 12.

Figure 14:
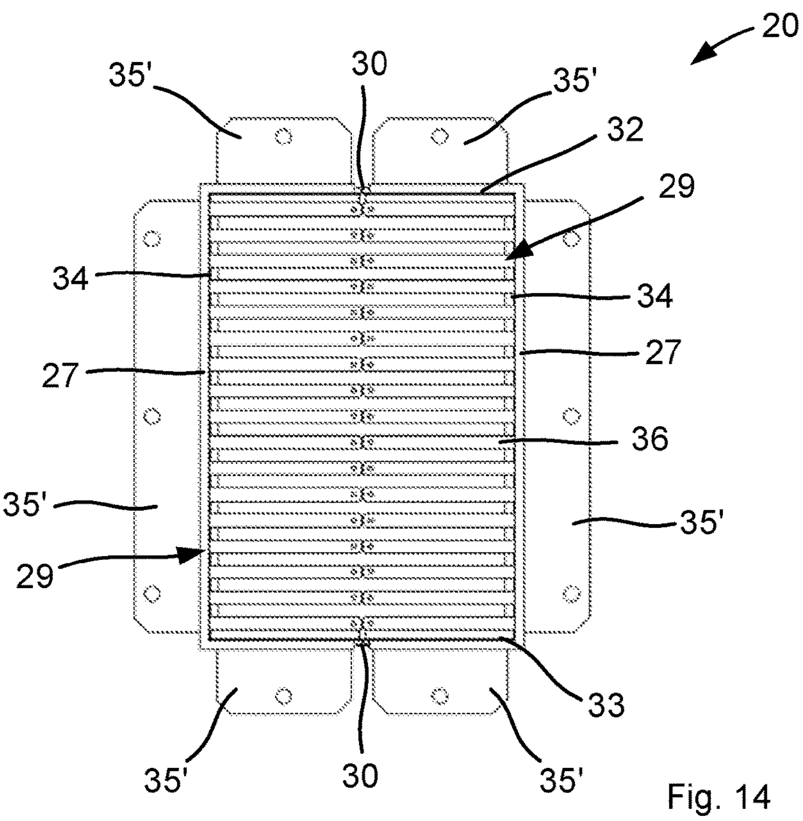
FIG. 14 is a schematic end view of an extension frame of two extension frame modules according to one embodiment.
Figure 15:
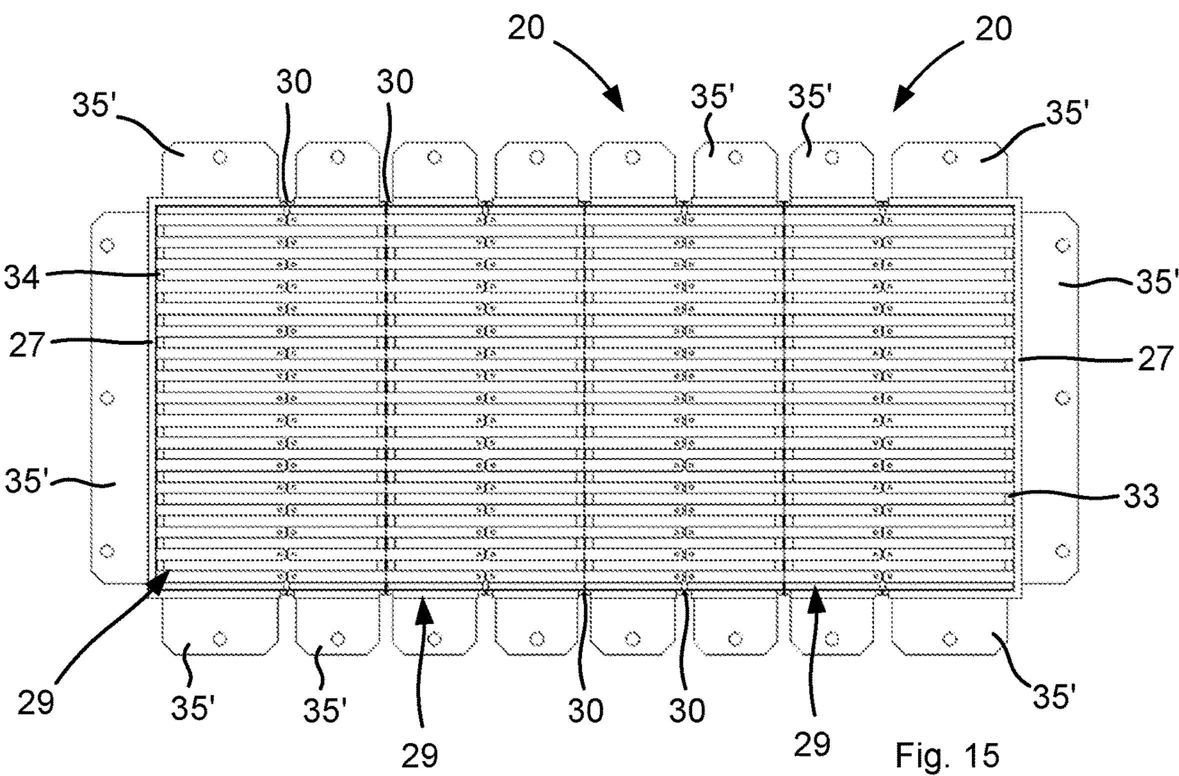
FIG. 15 is a schematic end view of a plurality of extension frame modules where the extension frame modules are connected by a form-fit lock according to one embodiment.

FIG. 14 illustrates two extension frame modules 29 connected by the connection elements 30 as described above, optionally also by means of the locking elements 31 as described above. The fastening elements 35' are provided on at least the two opposite first and second walls 32, 33 and optionally also on the third wall 34 for extension frame modules 29 used as end modules. The fastening elements 35' are e.g. provided along the circumference of the connected extension frame modules 29 and can be fastened to a side of a partition 12 which is opposite to the side of the partition 12 to which the mounting frame 19 is to be attached. FIG. 15 illustrates generally the same features shown in FIG. 14 but with a plurality of interconnected extension frame modules 29, wherein intermediate extension frame modules 29 only are provided with fastening elements 35' on the two opposite first and second walls 32, 33, wherein extension frame modules 29 used as end modules are provided with a fastening element 35' also on the third wall 34.

The invention claimed is:

1. A transit device for leading one or more cables and/or pipes through an opening in a partition, the transit device comprises an extension frame connectable to a mounting frame and/or the partition and having an axially extending through opening for the cables and/or pipes, wherein the extension frame comprises a plurality of extension frame modules, each extension frame module having a first end, a second end and axially extending edge portions extending between the first end and the second end, the axially extending edge portions are provided with connection elements, the extension frame modules are connectable to each other through the connection elements to form the extension frame, the first end of said extension frame modules is provided with a fastening element for fastening to the mounting frame and/or the partition, and each connection element comprises a hook portion for connection to a hook portion of an adjacent extension frame module through a locking element.

2. The transit device according to claim 1, wherein each of the axially extending edge portions are provided with connection elements.

3. The transit device according to claim 1, wherein each extension frame module comprises four axially extending edge portions, two of which are free edge portions.

4. The transit device according claim 1, wherein each extension frame module comprises three axially extending walls.

5. The transit device according to claim 1, wherein the extension frame modules are identical.

6. The transit device according to claim 1, wherein the locking element is a strip or clip enclosing one or more connecting elements of two adjacent extension frame modules.

7. The transit device according to claim 1, wherein each extension frame module is provided with one or more strips of intumescent material.

8. The transit device according to claim 7, wherein the one or more strips of intumescent material of one extension frame module is/are aligned with corresponding strips of intumescent material of an adjacent extension frame module.

9. The transit device according to claim 7, wherein each extension frame module comprises a plurality of foldable tabs for holding the one or more strips of intumescent material.

10. The transit device according to claim 9, wherein the tabs are arranged in one or more rows distributed around the circumference of the extension frame, and wherein the one or more strips of intumescent material is/are placed next to at least one row of tabs, and wherein the tabs leave corresponding and at least partially unobstructed through holes in the extension frame after folding.

11. The transit device according to claim 1, wherein the transit device comprises the mounting frame, wherein the mounting frame comprises a plurality of mounting frame modules connectable to each other for forming the mounting frame.

12. The transit device according to claim 11, wherein each mounting frame module is provided with a removable cover, and wherein the cover is connected to the mounting frame module through a breakable peripheral notch and is formed with at least one breakable diagonal notch and/or a breakable crossing notch extending from the breakable peripheral notch to a free edge of the cover.

13. The transit device according to claim 1, wherein the extension frame is provided with a plurality of individually displaceable elements being displaceable from a first position, in which first position the displaceable elements extend in a direction radially inward, to a second position, in which second position the displaceable elements extend at least partially in a direction along the extension frame.

14. The transit device according to claim 1, wherein one or more compressible sealing modules for enclosing a cable and/or pipe is/are arranged in the mounting frame.

15. A transit device for leading one or more cables and/or pipes through an opening in a partition, the transit device comprises an extension frame connectable to a mounting frame and/or the partition and having an axially extending through opening for the cables and/or pipes, wherein the extension frame is provided with a plurality of individually displaceable elements being displaceable from a first position, in which first position the displaceable elements extend in a direction radially inward, to a second position, in which second position the displaceable elements extend at least partially in a direction along the extension frame.

16. The transit device according to claim 15, wherein a first end of the extension frame is connectable to the mounting frame and/or the partition and a second end of the extension frame is provided with the displaceable elements.

17. The transit device according to claim 15, wherein the displaceable elements comprise a first end and a second end, wherein the first end is connected to the extension frame in a connecting portion and wherein the displaceable elements are displaceable around the connecting portion.

18. The transit device according to claim 17, wherein the displaceable elements are elongated.

19. The transit device according to claim 17, wherein the second end of the displaceable elements is a free end.

20. The transit device according to claim 17, wherein the displaceable elements are bendable around the connecting portion from the first position to the second position.

21. The transit device according to claim 15, wherein the displaceable elements, in the first position, at least partially block an axially extending opening of the extension frame.

22. The transit device according to claim 15, wherein the displaceable elements, in the first position, extend perpendicular to the extension frame.

23. The transit device according to claim 15, wherein the extension frame comprises a plurality of walls, wherein at least two opposite walls are provided with displaceable elements.

24. The transit device according to claim 15, wherein one or more strips of intumescent material is/are placed on the inside and/or outside of the extension frame.

25. A transit device for leading one or more cables and/or pipes through an opening in a partition, the transit device comprises an extension frame connectable to a mounting frame and/or the partition and having an axially extending through opening for the cables and/or pipes, wherein the extension frame comprises a plurality of extension frame modules, each extension frame module having a first end, a second end and axially extending edge portions extending between the first end and the second end, the axially extending edge portions are provided with connection elements, the extension frame modules are connectable to each other through the connection elements to form the extension frame, the first end of said extension frame modules is provided with a fastening element for fastening to the mounting frame and/or the partition, each of the axially extending edge portions are provided with connection elements, each extension frame module comprises four axially extending edge portions, two of which are free edge portions, each extension frame module comprises three axially extending walls, and each of the extension frame modules has a U-shaped profile.

* * * * *